United States Patent
Karabinis et al.

(10) Patent No.: US 7,340,213 B2
(45) Date of Patent: Mar. 4, 2008

(54) INTRA- AND/OR INTER-SYSTEM INTERFERENCE REDUCING SYSTEMS AND METHODS FOR SATELLITE COMMUNICATIONS SYSTEMS

(75) Inventors: Peter D. Karabinis, Cary, NC (US); Santanu Dutta, Cary, NC (US); Gary G. Churan, Annandale, VA (US); Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 71 days.

(21) Appl. No.: 10/890,758

(22) Filed: Jul. 14, 2004

(65) Prior Publication Data

US 2005/0037749 A1 Feb. 17, 2005

Related U.S. Application Data

(60) Provisional application No. 60/490,993, filed on Jul. 30, 2003.

(51) Int. Cl.
*H04B 7/185* (2006.01)

(52) U.S. Cl. .............. 455/12.1; 455/13.1; 455/13.2

(58) Field of Classification Search ........ 455/527–531, 455/447, 12.1, 13.1, 13.2
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.
Ayyagari et al., "A satellite-augmented cellular network concept", *Wireless Networks*, Vo. 4, 1998, pp. 189-198.

(Continued)

*Primary Examiner*—Matthew Anderson
*Assistant Examiner*—Angelica M. Perez
(74) *Attorney, Agent, or Firm*—Myers Bigel Sibley & Sajovec PA

(57) ABSTRACT

A first radio signal is received via a first satellite reception path, for example, an antenna or spot beam, which serves a satellite cell. The received first radio signal includes a desired satellite uplink signal transmitted from a first source using a frequency assigned to the satellite cell and an interfering signal transmitted from at least one second source using the frequency assigned to the satellite cell. A second radio signal is received via a second satellite reception path, for example, via another antenna or spot beam of the system and/or via a satellite antenna beam of another system. The second radio signal includes a measure of the interfering signal. The first and second radio signals are processed to recover the desired satellite uplink signal.

88 Claims, 6 Drawing Sheets

U.S. PATENT DOCUMENTS

| | | |
|---|---|---|
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A * | 12/1996 | Martinez et al. ........... 455/13.1 |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,901,343 A * | 5/1999 | Lange ........................ 455/63.1 |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,636,734 B1 * | 10/2003 | Berger et al. ............... 455/427 |
| 6,684,057 B2 | 1/2004 | Karabinis |
| 6,735,437 B2 | 5/2004 | Mayfield et al. |
| 6,775,251 B1 * | 8/2004 | Wiedeman et al. ......... 370/316 |
| 6,785,543 B2 | 8/2004 | Karabinis |
| 6,856,787 B2 | 2/2005 | Karabinis |
| 6,859,641 B2 * | 2/2005 | Collins et al. ............. 455/63.1 |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0022635 A1 | 1/2003 | Otten et al. |
| 2003/0054762 A1 | 3/2003 | Karabinis |
| 2003/0054815 A1 | 3/2003 | Karabinis |
| 2003/0068978 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 * | 5/2004 | Loner ........................ 455/12.1 |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0259504 A1 * | 12/2004 | Onggosanusi et al. ... 455/67.13 |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0135058 A1 | 6/2006 | Karabinis |
| 2006/0135060 A1 | 6/2006 | Karabinis |
| 2006/0135070 A1 | 6/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 797 319 A2 | 9/1997 |
| WO | WO 01/54314 A1 | 7/2001 |

OTHER PUBLICATIONS

Mallison et al., "Enabling Technologies for the Eurostar Geomobile Satellite," 19th AIAA Proceedings of International Communications Satellite Systems Conference, Apr. 17, 2001, 10 pgs.

* cited by examiner

US 7,340,213 B2

INTRA- AND/OR INTER-SYSTEM INTERFERENCE REDUCING SYSTEMS AND METHODS FOR SATELLITE COMMUNICATIONS SYSTEMS

RELATED APPLICATION

The present application claims priority from U.S. Provisional Application Ser. No. 60/490,993, entitled Intra- and/or Inter-System Interference Reducing Systems and Methods for Satellite Communications Systems, filed Jul. 30, 2003 and incorporated herein by reference in its entirety.

FIELD OF THE INVENTION

This invention relates to wireless communications systems and methods, and more particularly to terrestrial and satellite communications systems and methods.

BACKGROUND OF THE INVENTION

Satellite communications systems and methods are widely used for communications. Satellite communications systems and methods generally employ at least one space-based component, such as one or more satellites, that is configured to communicate with at least one radioterminal.

A satellite communications system or method may utilize a single antenna beam covering an entire area served by the system. Alternatively, in "cellular" satellite communications systems and methods, multiple beams are provided, each of which can serve substantially distinct geographical areas in the overall service region of the system, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. As used herein, the term "radiotelephone" also includes any other radiating device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. Radiotelephones may also be referred to herein as "radioterminals" or simply "terminals".

As is well known to those having skill in the art, terrestrial networks that are configured to reuse at least some of the frequencies of a satellite communications system can enhance satellite system availability, efficiency and/or economic viability. In particular, it is known that it may be difficult for satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission of at least some of the frequencies of the satellite system can reduce or eliminate this problem.

Moreover, the capacity of an overall system (comprising space-based and terrestrial transmission of at least some of the frequencies allocated to the system) can be increased significantly by the introduction of terrestrial retransmission, since terrestrial frequency reuse can be much denser than that of a satellite-only system. In fact, capacity can be enhanced where it may be mostly needed, i.e., in densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

U.S. Pat. No. 6,684,057, to coinventor Karabinis, and entitled *Systems and Methods for Terrestrial Reuse of Cellular Satellite Frequency Spectrum*, the disclosure of which is hereby incorporated herein by reference in its entirety as if set forth fully herein, describes that a satellite radiotelephone frequency can be reused terrestrially by an ancillary terrestrial network even within the same satellite cell, using interference cancellation techniques. In particular, the satellite radiotelephone system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

United State Patent Application Publication No. 2003/0054761 A1, published Mar. 20, 2003 to coinventor Karabinis and entitled Spatial Guardbands for Terrestrial Reuse of Satellite Frequencies, the disclosure of which is hereby incorporated herein by reference in its entirety as if set forth fully herein, describes satellite radiotelephone systems that include a space-based component that is configured to provide wireless radiotelephone communications in a satellite footprint over a satellite radiotelephone frequency band. The satellite footprint is divided into a plurality of satellite cells, in which satellite radiotelephone frequencies of the satellite radiotelephone frequency band are spatially reused. An ancillary terrestrial network is configured to terrestrially reuse at least one of the satellite radiotelephone frequencies that is used in a satellite cell in the satellite footprint, outside the cell and in some embodiments separated therefrom by a spatial guardband. The spatial guardband may be sufficiently large to reduce or prevent interference between the at least one of the satellite radiotelephone frequencies that is used in the satellite cell in the satellite footprint, and the at least one of the satellite radiotelephone frequencies that is terrestrially reused outside the satellite cell and separated therefrom by the spatial guardband. The spatial guardband may be about half a radius of a satellite cell in width.

SUMMARY OF THE INVENTION

Some embodiments of the present invention allow two satellite and/or terrestrial communications systems to use the same frequency or frequencies for communications in geographically distinct, overlapping and/or congruent footprints while reducing interference in a given system (inter-system interference) that is caused by the same frequency signal(s) that is (are) used by the other system. In some embodiments, a satellite of a first satellite and/or terrestrial system includes a receive-only ancillary antenna that is configured to receive signals, occupying at least some of the frequencies of the first satellite and/or terrestrial system, from the second satellite and/or terrestrial system footprint. The received signal(s) from the ancillary antenna can be used to reduce interference to the first satellite and/or terrestrial system by the second satellite and/or terrestrial system. In other embodiments, at least some of the signals from the second satellite and/or terrestrial communications system that have occupied and/or are occupying at least some of the frequencies of the first satellite and/or terrestrial communications system are routed by a gateway and/or other component(s) of the first and/or second satellite and/or terrestrial system, before or after regeneration, to a gateway and/or other component(s) of the first satellite and/or terrestrial system. The routed signals may then be used to improve a signal-to-interference and/or -noise measure of a desired signal and for interference reduction of a desired signal. Finally, other embodiments need not use a separate ancillary (receive-only) antenna or inter-system routing to reduce interference. Rather, in a given satellite and/or terrestrial communications system, a desired signal plus interference received by a given satellite cell of a satellite over one or more frequencies, and received signals from at least one adjacent and/or non-adjacent satellite cells of the satellite, received over the one or more frequencies, are provided to a signal processor (interference reducer) that may include a plurality of transversal filters and a control mechanism that is used to adjust coefficients of the transversal filters. The signal processor (interference reducer) may be configured to use at least one transversal filter to form an output signal and/or may be configured to perform mathematical operations, such as a matrix inversion, vector-matrix multiplication, scalar multiplication, subtraction, and/or addition, on the first and/or second signals (and/or on at least one measure thereof) to form an output signal. Accordingly, these embodiments of the present invention allow two separate satellite and/or terrestrial communications systems to share at least some frequencies, while reducing or minimizing potential interference.

Other embodiments of the present invention can use a signal processor (interference reducer), that may include a plurality of transversal filters and a control mechanism, to reduce interference within the satellite and/or terrestrial radiotelephone system (intra-system interference) that is caused by terrestrial reuse and/or intra-satellite system reuse of one or more frequencies that may also be used for space-based communications by a given satellite cell, and/or to improve a signal-to-interference and/or -noise measure of a desired signal of the given satellite cell. In some embodiments, the signals that are received at the satellite by a given satellite cell over a given frequency or frequencies, and the signals that are received at the satellite by adjacent and/or non-adjacent satellite cells over the given frequency or frequencies, are provided to a signal processor (interference reducer), to reduce and/or eliminate interference from one or more ancillary terrestrial components and/or intra-satellite frequency reuse that also use the given frequency or frequencies for terrestrial wireless and/or satellite communications. In other embodiments, signals at the given frequency or frequencies that are received from adjacent and/or non-adjacent satellite cells that do not reuse the given frequency or frequencies for satellite communications, also are provided to the signal processor (interference reducer) to reduce or eliminate interference by the terrestrial reuse of the frequency or frequencies by the same or another system and/or to improve a signal-to-interference and/or -noise measure of a desired signal. The signal processor (interference reducer) may be configured to use at least one transversal filter to form an output signal and/or may be configured to perform mathematical operations, such as a matrix inversion, vector-matrix multiplication, scalar multiplication, subtraction, and/or addition, on the first and/or second signals (and/or on at least one measure thereof) to form an output signal.

Yet other embodiments of the present invention can combine the embodiments that were described above to provide both inter- and intra-system interference reduction, minimization and/or cancellation. Accordingly, inter- and/or intra-system interference from terrestrial- and/or space-based reuse of radiotelephone frequencies can be reduced, minimized or eliminated.

In some embodiments of the present invention, methods of operating a satellite and/or terrestrial radiotelephone communications system are provided. A first radio signal is received via a first satellite reception path, for example, an antenna or spot beam, which serves a satellite cell. The received first radio signal includes a desired satellite uplink signal transmitted from a first source using a frequency or frequencies assigned to the satellite cell and an interfering signal transmitted from at least one second source using at least one frequency assigned to the satellite cell. A second radio signal is received via a second satellite reception path, for example, via another antenna (ground- and/or space-based) or spot beam of the system and/or via a satellite and/or terrestrial infrastructure of another satellite and/or terrestrial communications system. The second radio signal includes a measure of the interfering signal. The first and second radio signals are processed mathematically (software) and/or by an electronic circuit (hardware) to recover at least one measure of the desired satellite uplink signal.

In further embodiments, the second satellite reception path may be configured to preferentially receive radio transmissions from an area outside of the satellite cell. For example, the area outside of the satellite cell may include another satellite cell that uses at least one of the frequencies assigned to and/or used by the satellite cell and/or a coverage area of another satellite and/or terrestrial communications system that uses at least one of the frequencies assigned to and/or used by the satellite cell.

In some embodiments of the present invention, the first and second satellite reception paths may include respective first and second spot beams that serve respective first and second satellite cells of the satellite and/or terrestrial radiotelephone communications system. The second satellite cell may use a frequency or frequencies assigned to and/or used by the first satellite cell, may be adjacent a third satellite cell that uses a frequency or frequencies assigned to and/or used by the first satellite cell, may overlap or be adjacent a terrestrial cell and/or area that uses a frequency or frequencies assigned to and/or used by the first satellite cell and/or may overlap or be adjacent a coverage area of a second satellite and/or terrestrial radiotelephone communications system that uses a frequency or frequencies assigned to and/or used by the first satellite cell.

According to some embodiments, the first satellite reception path includes a first satellite antenna positioned at a first satellite of the satellite and/or terrestrial radiotelephone communications system, and the second satellite reception path includes a second satellite antenna positioned at a second satellite of the satellite and/or terrestrial radiotelephone communications system. In other embodiments, the first satellite reception path may include a first satellite antenna positioned at a satellite of the satellite and/or terrestrial radiotelephone communications system, and the second satellite reception path may include a second and/or the first satellite antenna positioned at the same satellite.

In yet further embodiments, the second satellite reception path may include a satellite of a second satellite and/or terrestrial radiotelephone communications system. The second satellite reception path may further include a terrestrial antenna configured to receive a feeder link transmission from the satellite of the second satellite and/or terrestrial radiotelephone communications system, and the second radio signal may be conveyed to the first and/or second satellite and/or terrestrial radiotelephone communications system via the terrestrial antenna. The terrestrial antenna may be coupled to a gateway of the first and/or second satellite and/or terrestrial radiotelephone communications system, and the second radio signal may be conveyed to the first satellite and/or terrestrial radiotelephone communications system via the gateway of the first and/or second satellite and/or terrestrial radiotelephone communications system. The terrestrial antenna may be coupled to a gateway of the first and/or second satellite and/or terrestrial radiotelephone communications system, e.g., directly or through other elements of the first and/or second system, and the second radio signal may be conveyed from the terrestrial antenna to the gateway of the first and/or second satellite and/or terrestrial radiotelephone communications system.

According to other aspects of the present invention, the first and second radio signals may be applied to a signal processor (interference reducer) comprising respective first and second transversal filters. Outputs of the first and second transversal filters may be combined, and at least one measure of the desired signal may be recovered from the combined outputs. The first and second transversal filters may be adjusted responsive to a measure of the combined outputs and/or a measure of the first and/or second radio signals. The signal processor (interference reducer) may be configured to use at least one transversal filter to form an output signal and/or may be configured to perform mathematical operations, such as a matrix inversion, vector-matrix multiplication, scalar multiplication, subtraction, and/or addition, on the first and/or second signals (and/or on at least one measure thereof) to form an output signal.

According to other aspects of the present invention, first and second radio signals are received via respective first and second spot beams that serve respective first and second satellite cells of the satellite and/or terrestrial radiotelephone communications system. The first radio signal includes a desired satellite uplink signal transmitted from a first source in the first satellite cell using a frequency or frequencies assigned to the first satellite cell and an interfering signal transmitted from at least one second source using at least one frequency assigned to and/or used by the first satellite cell, and the second radio signal includes a measure of the interfering signal. The first and second radio signals are processed using, for example, an adaptive signal processor (adaptive interference reducer), to improve a signal-to-interference and/or -noise measure of the desired satellite uplink signal and recover the desired satellite uplink signal. The adaptive signal processor (adaptive interference reducer) may be configured to use at least one transversal filter to form an output signal and/or may be configured to perform mathematical operations, such as a matrix inversion, vector-matrix multiplication, scalar multiplication, subtraction, and/or addition, on the first and/or second signals (and/or on at least one measure thereof) to form an output signal.

In additional embodiments of the present invention, a first radio signal is received via a first satellite reception path that serves a satellite cell of the first satellite and/or terrestrial radiotelephone communications system. The first radio signal includes a desired satellite uplink signal transmitted from a first source using a frequency or frequencies assigned to the satellite cell and an interfering signal transmitted from at least one second source communicating with the second satellite and/or terrestrial radiotelephone communications system using at least one frequency assigned to and/or used by the satellite cell. A second radio signal is received via a second satellite reception path configured to preferentially receive transmissions from a coverage area of the second satellite and/or terrestrial communications system. The second radio signal includes a measure of the interfering signal. The first and second radio signals are processed to recover the desired satellite uplink signal.

According to some embodiments of the present invention, methods of operating a first satellite and/or terrestrial radiotelephone communications system to reduce interference from a second satellite and/or terrestrial communications system are provided. A first radio signal is received via a first satellite configured to preferentially receive transmissions from a coverage area of the first satellite and/or terrestrial radiotelephone communications system. The first radio signal includes a desired satellite uplink signal transmitted from a first source in the coverage area of the first satellite and/or terrestrial radiotelephone communications system and an interfering signal transmitted from at least one second source communicating with the second satellite and/or terrestrial communications system using at least one frequency of the first signal. A second radio signal is received via a second satellite and/or terrestrial antenna configured to preferentially receive transmissions from a coverage area of the second satellite and/or terrestrial communications system. The second radio signal includes a measure of the interfering signal. The first and second radio signals are processed to recover the desired satellite uplink signal. The second radio signal may be received from the second satellite via a terrestrial antenna configured to receive feeder link transmissions from the second satellite.

In some system embodiments of the present invention, a system includes a first satellite reception path that serves a satellite cell and that receives a first radio signal. The first radio signal includes a desired satellite uplink signal transmitted from a first source using a frequency or frequencies assigned to the satellite cell and an interfering signal transmitted from at least one second source using at least one frequency assigned to and/or used by the satellite cell. The system further includes a second satellite reception path that receives a second radio signal including a measure of the interfering signal. The system also includes an interference-suppressing signal processor that processes the first and second radio signals to recover at least one measure and/or at least one element of the desired satellite uplink signal. The interference-suppressing signal processor may be configured to use at least one transversal filter to form an output signal and/or may be configured to perform mathematical operations, such as a matrix inversion, vector-matrix multiplication, scalar multiplication, subtraction, and/or addition, on the first and/or second signals (and/or on at least one measure thereof) to form an output signal.

In further embodiments of the present invention, an apparatus includes an interference-suppressing signal processor configured to receive a first radio signal from a first satellite reception path that serves a satellite cell. The first radio signal includes a desired satellite uplink signal transmitted from a first source using a frequency or frequencies assigned to the satellite cell and an interfering signal transmitted from at least one second source using at least one frequency assigned to and/or used by the satellite cell. The interference-suppressing signal processor is further configured to receive a second radio signal from a second satellite reception path that receives a second radio signal including a measure of the interfering signal, and to process the first and second radio signals to recover at least one measure and/or at least one element of the desired satellite uplink signal. The interference-suppressing signal processor may include an adaptive interference reducer. The interference-suppressing signal processor may include first and second transversal filters that receive respective ones of the first and second radio signals, a combiner that combines outputs of the first and second transversal filters, and a detector that recovers at least one measure and/or element of the desired signal from the combined outputs. The interference-suppressing signal processor may further include a controller that adjusts the first and second transversal filters responsive to a measure of the combined outputs and/or a measure of the first and/or second radio signals. The interference suppressing signal processor and/or the interference reducer may be configured to use at least one transversal filter to form an output signal and/or may be configured to perform mathematical operations, such as a matrix inversion, vector-matrix multiplication, scalar multiplication, subtraction, and/or addition, on the first and/or second signals (and/or on at least one measure thereof) to form an output signal.

According to additional embodiments of the present invention, a satellite and/or terrestrial radiotelephone communications system includes first and second spot beams that serve respective first and second satellite cells of the satellite and/or terrestrial radiotelephone communications system and that receive respective first and second radio signals. The first radio signal includes a desired satellite uplink signal transmitted from a first source in the first satellite cell using a frequency or frequencies assigned to the first satellite cell and an interfering signal transmitted from at least one second source using at least one frequency assigned to the first satellite cell. The second radio signal includes a measure of the interfering signal. The system further includes an interference-suppressing signal processor that processes the first and second radio signals to recover the desired satellite uplink signal.

In yet further embodiments of the present invention, a system includes a first satellite reception path that serves a satellite cell of a first satellite and/or terrestrial radiotelephone communications system and receives a first radio signal therefrom. The first radio signal includes a desired satellite uplink signal transmitted from a first source using a frequency or frequencies assigned to the satellite cell and an interfering signal transmitted from at least one second source communicating with a second satellite and/or terrestrial radiotelephone communications system using at least one frequency assigned to the satellite cell. The system also includes a second satellite reception path that preferentially receives transmissions from a coverage area of the second satellite and/or terrestrial communications system and that receives a second radio signal including a measure of the interfering signal. The system further includes an interference-suppressing signal processor that processes the first and second radio signals to recover the desired satellite uplink signal.

In additional embodiments, a system includes a first satellite configured to preferentially receive transmissions from a coverage area of a first satellite and/or terrestrial radiotelephone communications system and that receives a first radio signal including a desired satellite uplink signal transmitted from a first source in the coverage area of the first satellite and/or terrestrial radiotelephone communications system using a frequency or frequencies and an interfering signal transmitted from at least one second source communicating with a second satellite and/or terrestrial communications system using the frequency or at least one of the frequencies. The system also includes a terrestrial antenna configured to receive feeder link transmissions from a second satellite configured to preferentially receive transmissions from a coverage area of the second satellite and/or terrestrial communications system and that receives a second radio signal including a measure of the interfering signal. The system further includes an interference-suppressing signal processor that processes the first and second radio signals to recover the desired satellite uplink signal.

DETAILED DESCRIPTION

Figure 1:
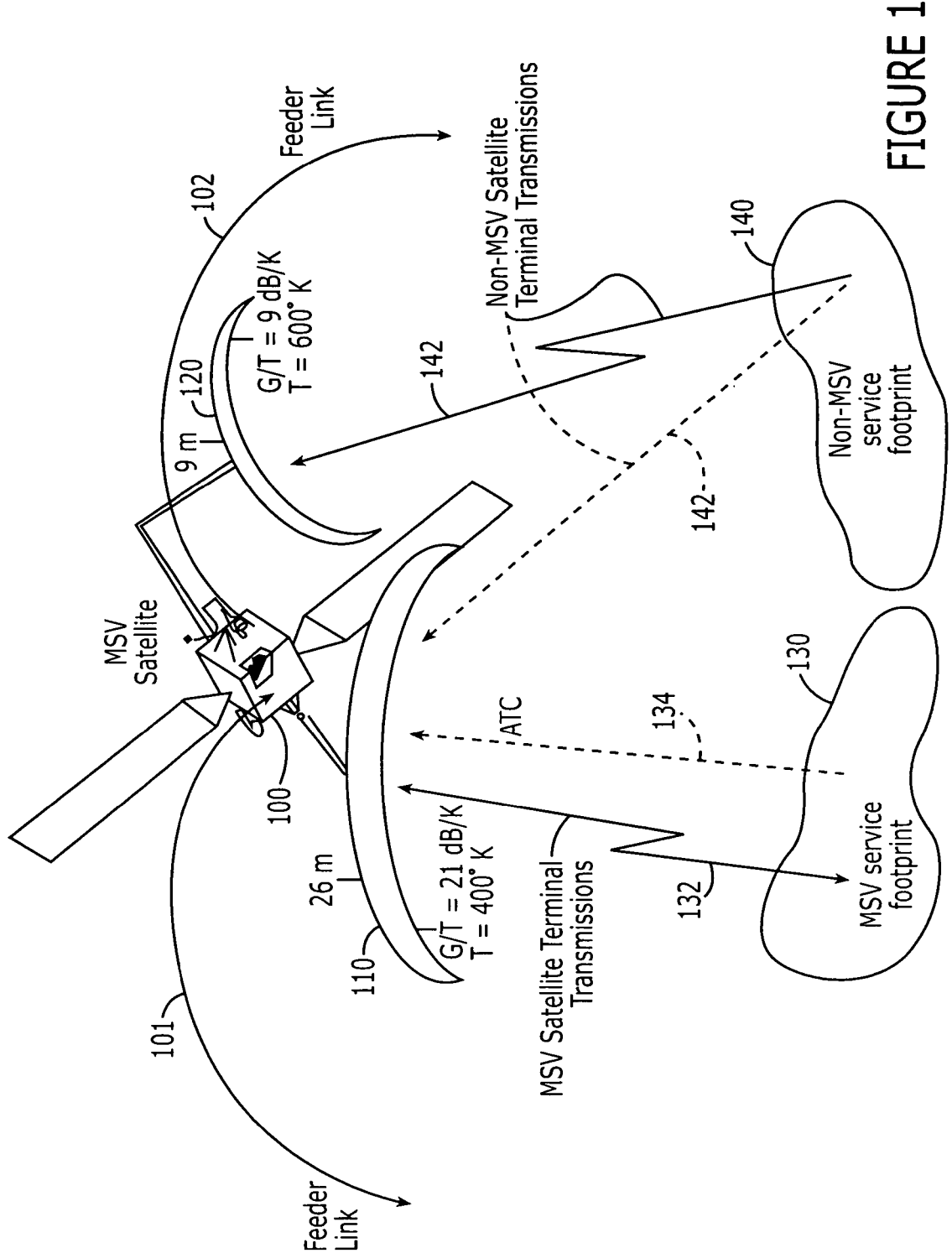
FIG. 1 is a schematic diagram illustrating a satellite communications system and operations thereof according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items. The symbol "/" is also used as a shorthand notation for "and/or". As used herein the term "measure" of a given signal includes any parameter and/or any measurable and/or calculable quantity (irrespective of any measurement and/or calculation error or inaccuracy); and/or signal that is related to, derived from, and/or generated (via natural and/or man-made processes) from the given signal.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention described herein involve the use of diverse satellite reception paths to receive desired satellite uplink signals and one or more interfering signals. As used herein, a "satellite reception path" generally refers to one or more elements that are configured to receive and convey satellite-received signals, i.e., signals that impinge upon a satellite from, for example, terrestrially positioned sources, such as radiotelephones. Accordingly, a satellite reception path may include, but is not limited to, a satellite antenna, a spot beam supported by a satellite antenna, electronic circuitry (hardware and/or software) that receives, processes, and transports signals received by a satellite antenna, and terrestrially-based antennas and hardware and/or software that receive and/or process a satellite-received signal via, for example, a satellite relay mechanism. As used herein, a "radio signal" received by such a satellite reception path may include a radio-frequency carrier modulated signal transmitted by a source and/or data, voice or other signals combined with or embedded in such a radio-frequency signal.

Some embodiments of the present invention will be described herein relative to first and second satellite radiotelephone communications systems. For convenience, the first satellite radiotelephone communications system, and components thereof, may be referred to as "MSV" and may, in some embodiments, correspond to a satellite radiotelephone system provided by Mobile Satellite Ventures, LP, the assignee of the present invention. The second satellite radiotelephone system and/or components thereof may be referred to as "non-MSV." However, it will be understood that the invention is not limited to applications involving combinations of MSV and non-MSV systems, and that any first and second satellite radiotelephone communications systems may be encompassed by the designations MSV and non-MSV.

FIG. 1 illustrates a satellite 100 that is configured with two antennas 110, 120 according to some embodiments of the present invention. The antennas 110, 120 of the satellite 100 may be of different sizes (in the illustrated embodiments, 26 meters and 9 meters, respectively) and may be directed toward different service footprints 130, 140. The service footprints may be disjoint (as is illustrated in FIG. 1), may have some overlap, or be fully overlapping. Specifically, FIG. 1 shows the larger one 110 of the two satellite antennas 110, 120 operative directed toward an area 130 labeled "MSV service footprint", while the smaller antenna 120, also referred to herein as an ancillary antenna, is operative directed toward an area 140 labeled "non-MSV service footprint." The smaller antenna 120 may be configured to operate as a receive-only antenna. The larger antenna 110 may be configured to receive and transmit. Each antenna 110, 120 may be configured to form a plurality of spot beams (cells) over its respective footprint or area. In some embodiments antennas 110 and 120 may have identical or substantially identical size. In other embodiments, antenna 120 may be larger or smaller than antenna 110.

Satellite terminal transmissions 142 that may be intended for a non-MSV satellite (such as, for example, an Inmarsat satellite) may also be intercepted (intentionally or unintentionally) by at least one MSV satellite. At least some satellite terminal transmissions by non-MSV satellite terminals may be co-channel, or partially co-channel, and/or co-frequency, or partially co-frequency, with at least some of MSV's satellite terminal transmissions. Thus, at least some satellite terminal transmissions by non-MSV satellite terminals that may be intended for a non-MSV satellite and are co-channel, or partially co-channel, and/or co-frequency, or partially co-frequency, with at least some satellite terminal transmissions 132 of MSV's satellite terminals (that may be intended for MSV's satellite(s)) may cause interference to at least some receivers of MSV's satellite(s) and/or ground infrastructure (satellite gateway(s)). According to some embodiments of the present invention, systems and methods are provided that are capable of adaptively mitigating the effects of inter-system co-channel and/or co-frequency interference in order to allow improved communications performance and also to potentially facilitate more efficient reuse of radio frequency resources between systems.

At least one ancillary antenna on an MSV satellite (for example, the smaller antenna 120 on the MSV satellite of FIG. 1) may be operative configured and/or positioned, physically and/or electronically, to maximize a reception of emissions by non-MSV satellite terminal(s) that are intended for a non-MSV satellite. This antenna, thus configured and/or positioned, may receive substantially strong interference signals that may be used at an MSV infrastructure element (such as a satellite gateway) and/or at an MSV satellite to mitigate (reduce, suppress or substantially eliminate) interference signals that may be received by an MSV satellite antenna (such as the MSV satellite antenna 110 of FIG. 1) whose mission may be to provide communications service to at least one MSV user terminal over at least some portion of an MSV service area 130.

Still referring to FIG. 1, an Ancillary Terrestrial Network (ATN) comprising a plurality of Ancillary Terrestrial Components (ATCs) and ATC radioterminals may be deployed over certain areas of MSV's service footprint 130. An ATC comprises one or more radiating infrastructure elements, such as a base station with associated infrastructure. At least one radioterminal may communicate with the at least one radiating infrastructure element. Signals 134 that are radiated by an ATC and/or ATC radioterminal(s) may be intercepted by MSV's satellite(s) 100, causing additional interference.

According to some embodiments of the present invention, the Space Based Network (SBN), including a Space Based Component (SBC) (e.g., at least one satellite) and ground infrastructure (e.g., at least one gateway), includes systems and/or methods for adaptively mitigating interference received from at least certain elements of the ATN that may be reusing at least one frequency of the SBN (intra-system frequency reuse) to provide terrestrial communications. According to other embodiments of the present invention, the SBN also includes systems and/or methods that are capable of adaptively mitigating interference caused by intra-system frequency reuse by the SBN to provide satellite communications.

Figure 2:
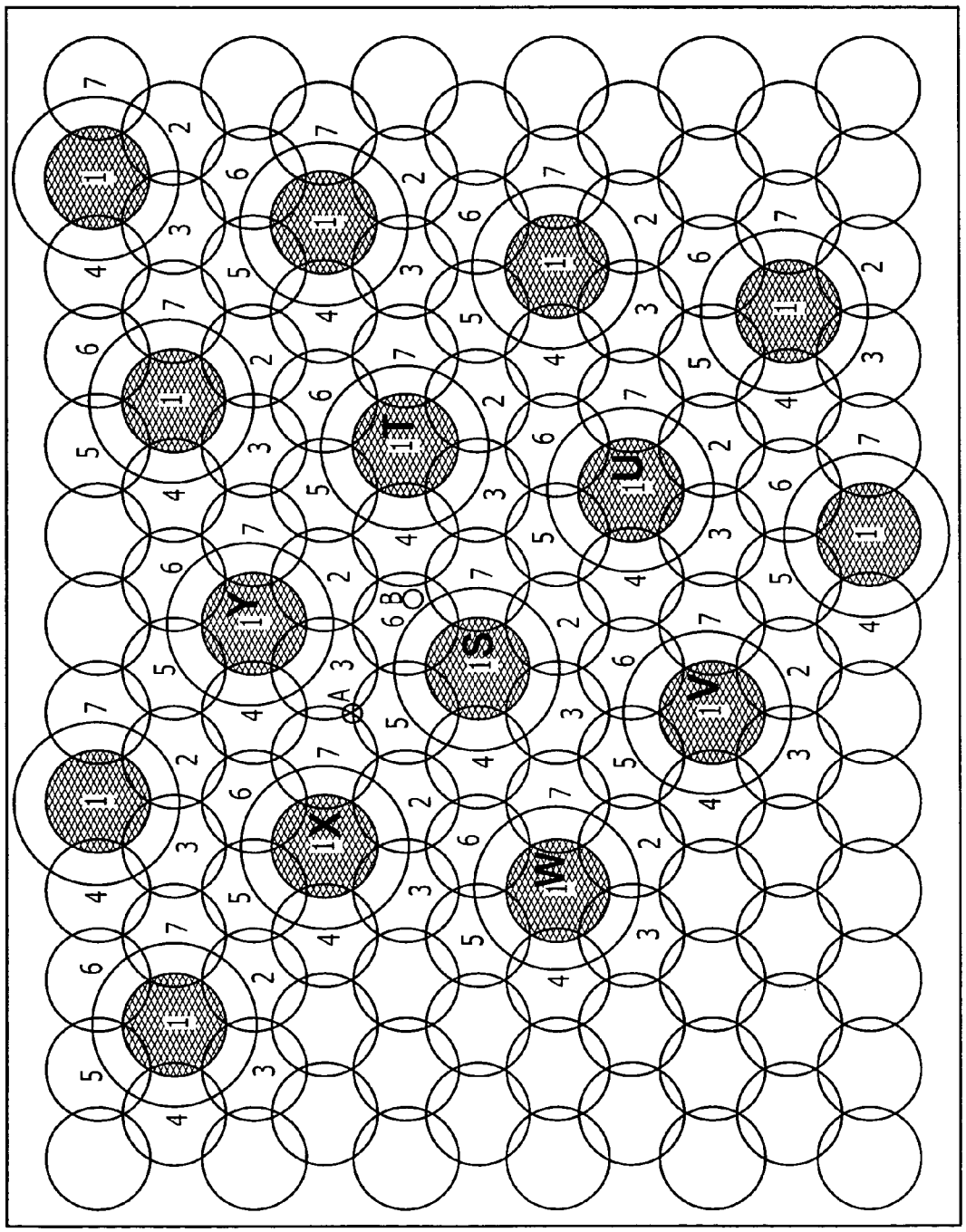
FIG. 2 is a cell layout diagram illustrating exemplary operations of a satellite communications system according to further embodiments of the present invention.

FIG. 2 illustrates an example of intra-system frequency reuse. As is illustrated in FIG. 2, a given frequency set (comprising one or more frequencies), frequency set 1 for example, may be used and reused for satellite communications by the SBN over at least a portion of a system's footprint in accordance with, for example, a seven-cell frequency reuse pattern, as illustrated in FIG. 2. A given satellite cell, such as satellite cell S, configured to receive at least one frequency of frequency set 1 from at least one radioterminal that is operative over a footprint of satellite cell S, may also receive interference from other intra-system terminal emissions intended, for example, for satellite cells T through Y, that may include at least some of the same frequencies being radiated by the at least one radioterminal that is operative over the footprint of satellite cell S. FIG. 2 also illustrates the location of two ATCs, labeled as A and B, which may also be reusing all or some of the frequencies of frequency set 1 to communicate terrestrially with ATC radioterminals. Thus, ATC emissions of ATC A and/or B (and/or other ATCs) and/or the radioterminals thereof may also cause interference to one or more receivers associated with satellite cell S and/or other satellite cells. Spatial guardbands, as described in the above-cited U.S. Patent Application Publication No. 2003/0054761 A1, are shown by the unshaded rings of FIG. 2.

Referring to FIGS. 1 and 2 and to the satellite antenna 110 that is serving MSV's service footprint 130 (see FIG. 1), at least some signals of at least some of the neighboring and/or non-neighboring satellite cells of a given satellite cell, such as satellite cell S, may be correlated to some degree with at least some components of an interference of the given satellite cell (such as satellite cell S). Such signals may be transported to, for example, a satellite gateway via a satellite feeder link, such as the satellite feeder link 101 and/or 102 of FIG. 1, to serve as inputs to an interference suppressor. In addition, at least some signals of at least some of the neighboring satellite cells of a given satellite cell, such as satellite cell S, may be correlated to a degree with at least one component of a desired signal of the given satellite cell (such as satellite cell S). Such signals of the neighboring satellite cells that are correlated to a degree with the at least one component of the desired signal of the given satellite cell may, in some embodiments, be transported to, for example, a satellite gateway via a satellite feeder link, such as the satellite feeder link 101 and/or 102 of FIG. 1, to serve as inputs to a signal processor, that may also be an interference suppressor, to improve a desired signal-to-interference measure at-an output of the signal processor and/or the interference suppressor. Relative to the satellite antenna 120 that is operatively directed toward the non-MSV service footprint 140, at least some of its received signals that may be used to suppress interference received by the satellite antenna 110 serving the MSV footprint 130, may be transported to, for example, an MSV satellite gateway via a satellite feeder link, such as the satellite feeder link 101 and/or 102 of FIG. 1.

The two satellite feeder links 101, 102 illustrated in FIG. 1 may use different frequencies and/or different frequency bands to transmit information to the ground to two or more spatially proximate or spatially distant receive antennas or to a single antenna. In some embodiments, the information transported to the ground (i.e., to a satellite gateway) by the feeder links 101, 102 illustrated in FIG. 1 may be accommodated by a single feeder link using the frequencies of a single frequency band. In other embodiments, a satellite may be configured with two or more feeder links, using the frequencies of one or more frequency bands, to transport information from a satellite to at least one ground facility (i.e., a satellite gateway) via a single, spatially distant, and/or spatially proximate feeder link receive antennas on the ground.

Figure 3:
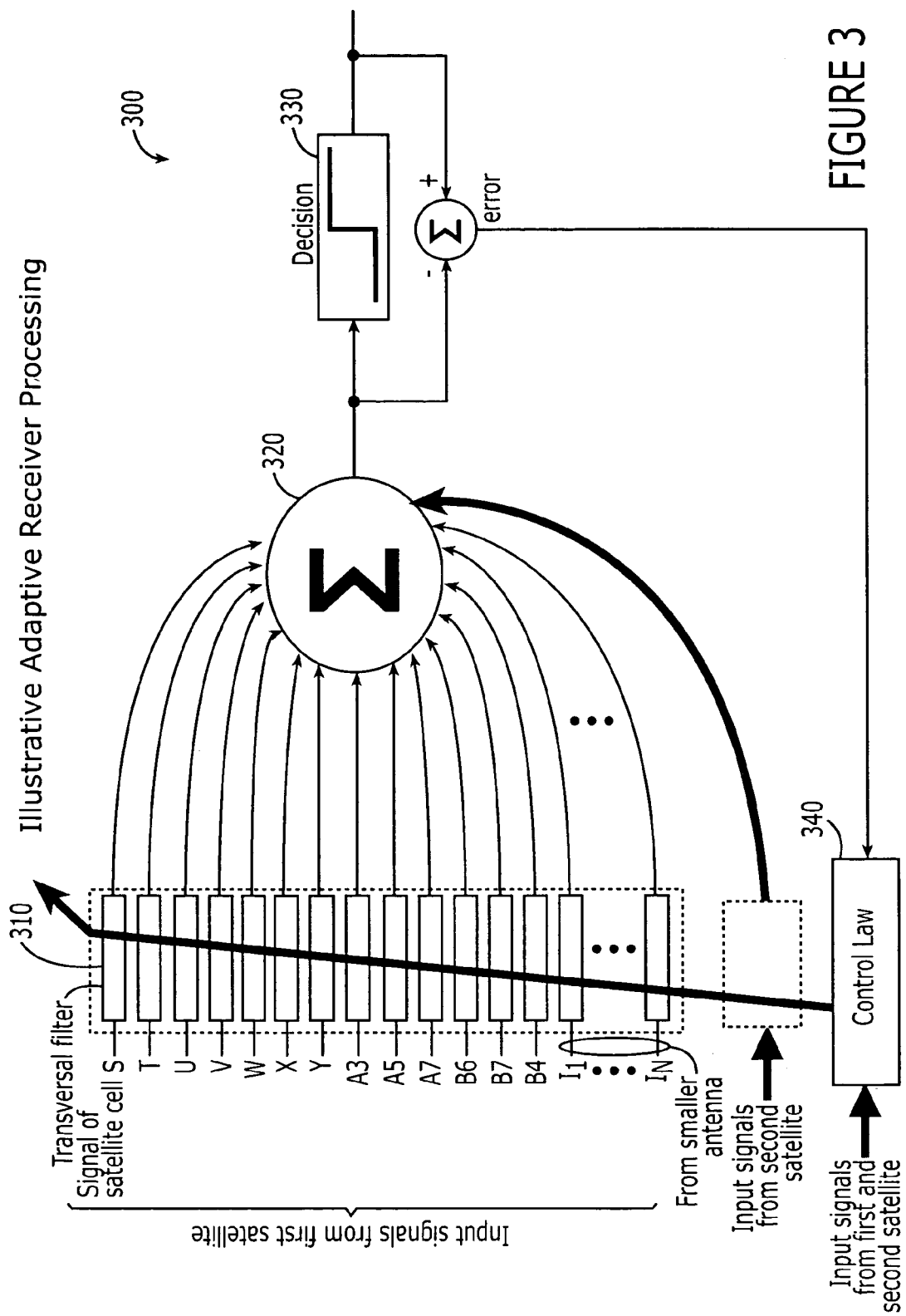
FIG. 3 is a schematic diagram of an interference-suppressing signal processor according to some embodiments of the present invention.

FIG. 3 illustrates an adaptive receiver 300 (also referred to as an adaptive interference reducer or an adaptive signal processor), that may be configured at a satellite gateway, at a satellite, and/or at any other location or locations (distributed functionality), to suppress interference that may be generated by intra- and/or inter-system frequency reuse. Specifically, the receiver architecture of FIG. 3 is shown operative to suppress interference that may be at least partially co-channel and/or co-frequency with a given "desired signal" received by a satellite cell such as satellite cell S of FIG. 2. The receiver 300 depicted in FIG. 3 combines (in a combiner 320), in accordance with a control law or performance index (of a controller 340), such as a Least Mean Squared Error (LMSE) control law or performance index, via a plurality of (fractionally- and/or synchronously-spaced, feed-forward and/or decision-feedback) transversal filters 310, a plurality of signal inputs from a plurality of satellite cells that may be formed by one or more satellite antennas and/or satellites, to form a decision variable for recovering a desired signal in a detector 330.

Those skilled in the art will recognize that different control laws (other than LMSE), such as zero-forcing, may be used to form and/or update the transversal filter coefficients. Those skilled in the art will also recognize that different control law input signals may be required by the different control laws to derive update information for the plurality of transversal filter coefficients. For example, in accordance with the zero-forcing control law, the error quantity (see FIG. 3) and the output of the decision stage 330 of FIG. 3 may serve as inputs to the control law 340. It will also be recognized by those of skill in the art that the number of transversal filter coefficients per transversal filter 310 need not be the same over the ensemble of transversal filters depicted in FIG. 3. Some transversal filters may, for example, have seven (7) coefficients or taps, while others may have five (5) or only three (3) and some transversal filters may be limited to a single coefficient. In some embodiments, at least one transversal filter of the ensemble of transversal filters depicted in FIG. 3 may be deleted and the corresponding input signal may be provided directly to summing junction 320. In some embodiments, all transversal filters have an identical number of coefficients or taps (greater than or equal to one). Furthermore, in some embodiments, the architecture and/or control law associated with each transversal filter of the ensemble of transversal filters of FIG. 3 may not be the same for all transversal filters of the ensemble. For example, some transversal filters may be synchronously-spaced and operative based on a zero-forcing control law, others fractionally-spaced and operative based on a least mean-squared error control law, and others decision-feedback with either synchronously- or fractionally-spaced feed-forward sections operative on various combinations of control laws and/or performance measures.

Referring again to FIG. 3, it is seen that the top (first) transversal filter input labeled "signal of satellite cell S" denotes a desired signal plus interference, as received by satellite cell S (see FIG. 2). The transversal filter inputs T through Y represent signals that may be correlated to some degree with the interference of the desired signal that is due to intra-satellite system (SBN) frequency reuse. The transversal filter inputs T through Y represent signals from adjacent satellite system cells that use the same frequency or frequencies as satellite cell S. It will be understood that non-adjacent satellite cells that use the same frequency or frequencies as satellite cell S, shown by some or all of the cross-hatched cells other than cells S-Y, may also be provided to transversal filters of receiver 300.

The transversal filter inputs A3, A5, A7 and B6, B7, B4 of receiver 300 of FIG. 3 represent signals that are generated by transmissions of ATC A and B and/or the radioterminals thereof, respectively, that may be correlated with, at least some, interference components of the desired signal of satellite cell S. Fewer or more A and/or B signals and a correspondingly fewer or more transversal filters than the numbers shown in FIG. 3 may be provided in some embodiments. In particular, in FIG. 3, the signals from the three adjacent cells to an ATC that is terrestrially reusing the same frequency or frequencies as satellite cell S are provided. Thus, for ATC A, the signals from satellite cells 3, 5 and 7 are provided as inputs, and for ATC B, the signals from satellite cells 4, 6 and 7 are provided. In other embodiments, signals from non-adjacent satellite cells also may be provided.

The transversal filter inputs $I_1$ through $I_N$ provide signals from the smaller antenna of FIG. 1, that may be correlated with at least one interference component of the desired signal of satellite cell S that may be due to inter-system frequency reuse. It is understood that, in general, all transversal filter input signals shown in FIG. 3 may provide both interference and desired signal components.

In some embodiments, the number of antenna(s) of a satellite that may be directed toward another satellite radiotelephone system service footprint may be reduced or eliminated. Thus, in some embodiments, the small antenna of the satellite of FIG. 1 may be eliminated. In such embodiments, the transversal filter inputs $I_1$ through $I_N$ of FIG. 3 may be replaced with signals derived from the co-system (intra-system) satellite antenna cell patterns.

Thus, some embodiments of the present invention can use an adaptive interference reducer to reduce, minimize or eliminate intra- and/or inter-system interference by providing as input signals for a plurality of transversal filters, signals of a given satellite cell (such as S) and adjacent satellite cells (such as T-Y) that reuse one or more frequencies of the given satellite cell (such as S). Thus, in some embodiments, input signals from satellite cells S-Y may be used as inputs to an adaptive interference reducer, to reduce interference from co-frequency intra-system reuse. Other embodiments of the present invention can add one or more of the following groups of signals as inputs to an adaptive interference reducer, to further reduce interference and/or improve a signal-to-interference measure of a desired signal:

(1) Signals from non-adjacent cells, such as one or more cross-hatched cells 1 of FIG. 2, other than cells S-Y that reuse one or more frequencies of the given satellite cell S;

(2) Signals from satellite cells that contain over a geographic footprint an ATC which is terrestrially reusing at least one of the satellite frequencies as the given satellite cell, such as satellite cell 6 that contains ATC B therein, or satellite cells 3, 7 and 5, that contain ATC A therein;

(3) Signals from satellite cells that are immediately adjacent a cell described in (2) above;

(4) Signals from satellite cells that are remote from the satellite cells described in (2) above;

(5) Signals from an ancillary antenna at the satellite that is pointed at the satellite footprint of another satellite system that reuses at least one of the frequencies of the given satellite cell S, for example, input signals $I_1$-$I_N$ of FIG. 3;

(6) Signals from a second satellite in the given satellite radiotelephone system, that receives at least one of the frequencies of the given cell, if the space based network includes multiple satellites, as shown in FIG. 3 by the dashed box labeled "Input signals from second satellite";

(7) Signals from another satellite radiotelephone system that reuses at least one of the frequencies of satellite cell S that may be provided, for example, by a gateway and/or other component of the other and/or same satellite radiotelephone system; and/or (8) Signals from cells adjacent to satellite cell S.

Sub-combinations and combinations of these input signals also may be provided to the adaptive interference reducer.

Figure 4:
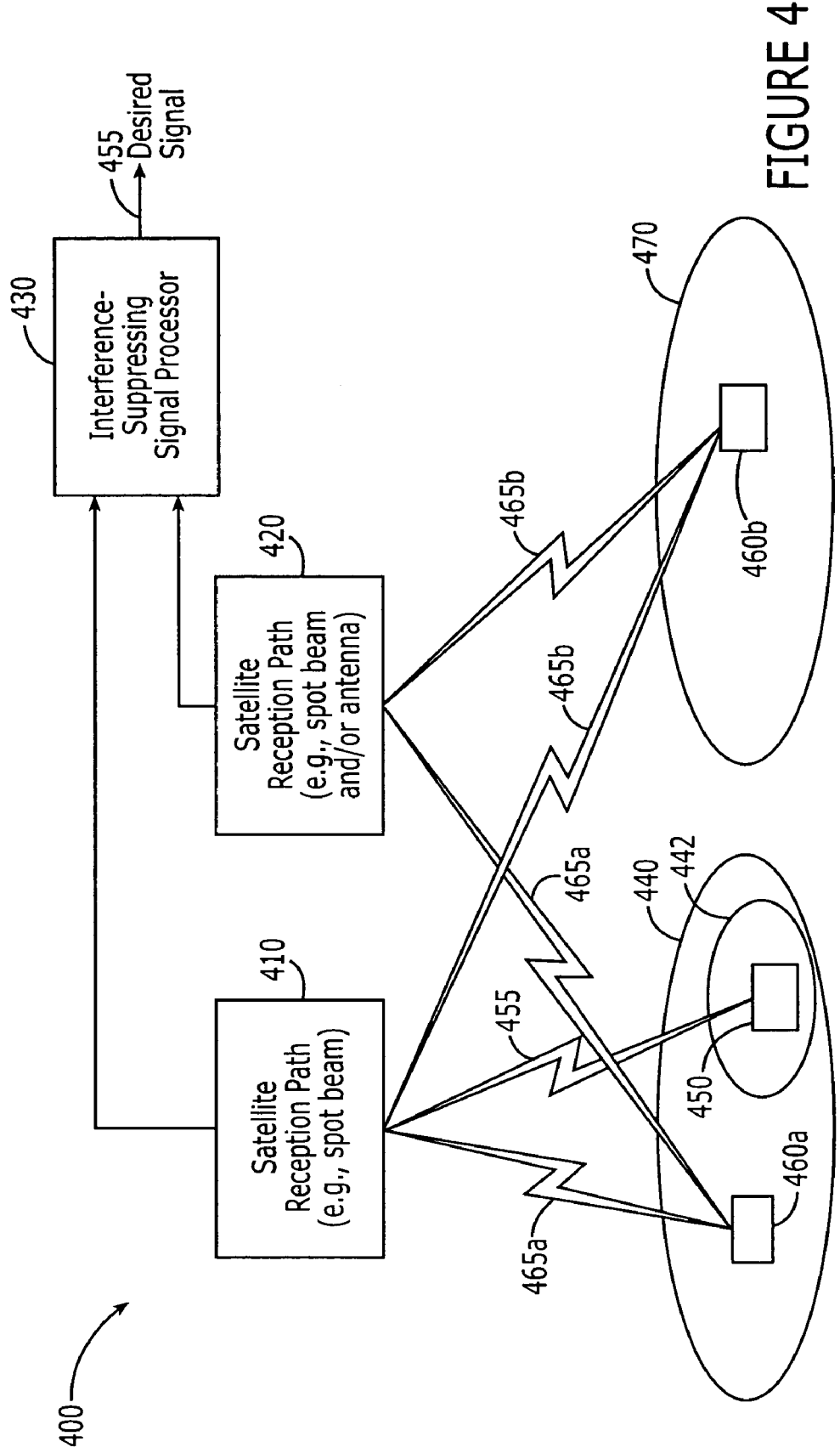
FIGS. 4, 5, and 6 are schematic diagrams illustrating satellite communications systems and operations thereof according to additional embodiments of the present invention.

Further embodiments of the present invention are illustrated in FIG. 4. As shown, a system 400 includes a first and second satellite reception paths 410, 420. The first satellite reception path 410 serves a satellite cell 442 of a coverage area 440 of a satellite radiotelephone communications system (e.g., the MSV system of FIG. 1). It will be appreciated that the first satellite reception path 410 may include, for example, a spot beam of a satellite (e.g., the satellite 100 of FIG. 1), along with other components for conveying satellite-received signals. The first satellite reception path 410 receives a first signal including a desired signal 455 transmitted by a source 450 (e.g., a satellite terminal) and an interfering signal transmitted by a second source, which may include, for example, an interfering signal 465a transmitted by a source 460a within the coverage area 440 (e.g., another satellite terminal and/or an ATC) and/or an interfering signal 465b transmitted by a source 460b positioned outside of the coverage area (e.g., in a coverage area 470 of a second satellite communications system).

The signals received by the first and second satellite reception paths 410, 420 are provided to an interference-suppressing signal processor 430, which processes the received signals to recover the desired signal 455. The signal processor 430 may include, for example, an adaptive interference reducer along the lines described above with reference to FIG. 3.

Figure 5:
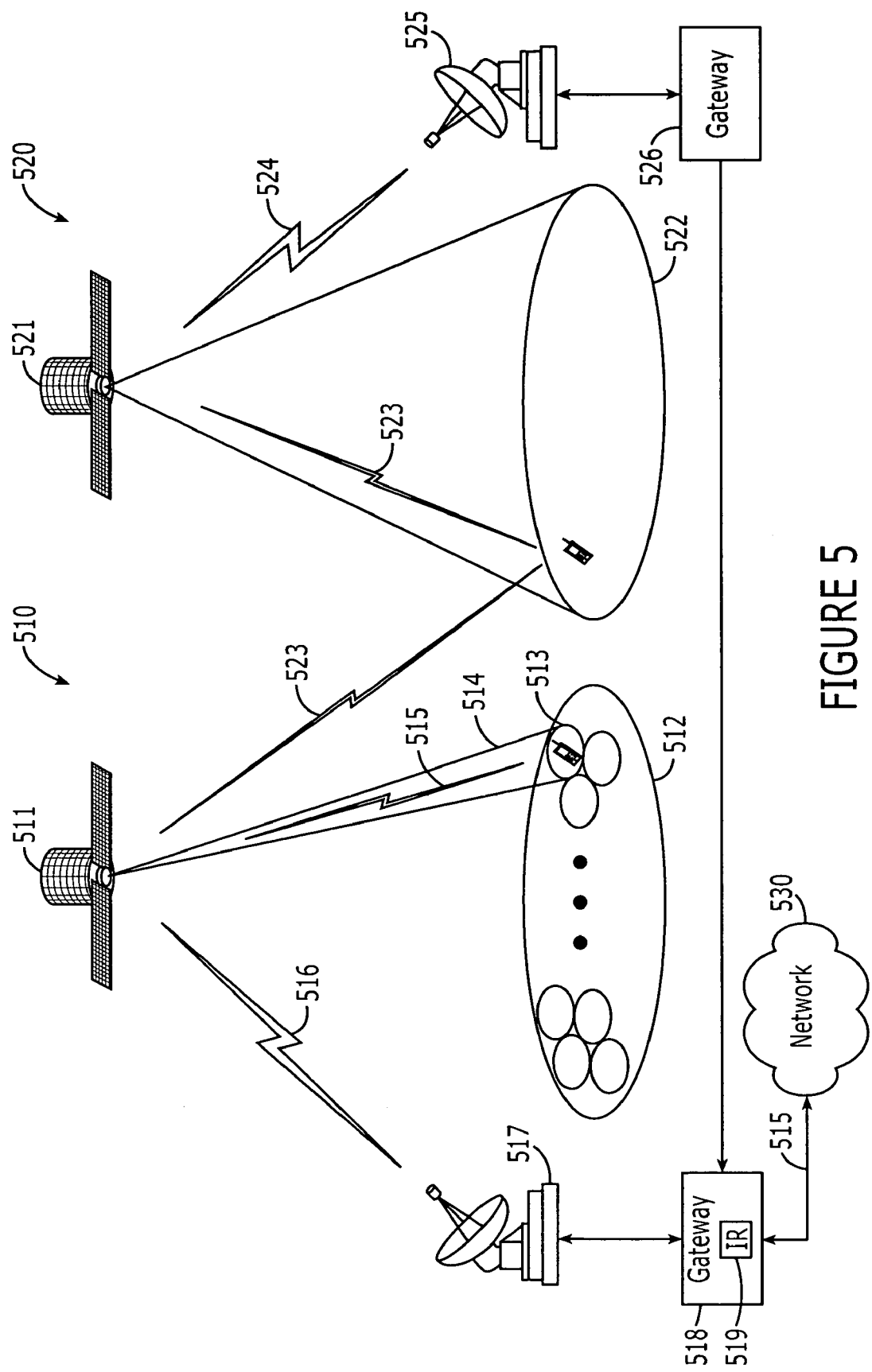

In further embodiments of the present invention, inter-system interference may be suppressed using a satellite reception path that is responsive to elements of an interfering satellite communications system. For example, as shown in FIG. 5, interference in a first satellite radiotelephone communications system 510 introduced by an adjacent or overlapping second satellite communications system 520 may be reduced by capturing feeder downlink signals 524 that include information on interfering signals generated by users and/or components of the interfering system 520. In particular, the first satellite radiotelephone communications system 510 includes at least one satellite 511 that supports a satellite reception path that includes a spot beam 514 that serves a satellite cell 513. The spot beam 514 receives a signal including a desired signal 515 transmitted by a terminal in the cell 513 and an interfering signal 523 transmitted using the same frequency by a source, e.g., at least one terminal, that is in communication with a satellite 521 and/or an ATN of the second system 520. The satellite 521 of the second system 520 receives a signal that also includes a measure of the interfering signal 523.

As shown, the first system 510 includes a gateway 518 served by a terrestrial antenna 517 that receives a feeder downlink signal 516 from the satellite 511. It will be appreciated that the feeder downlink signal 516 includes the signal received by the spot beam 514. The second system 520 similarly includes a gateway 526 that is served by a terrestrial antenna 525 that receives a feeder downlink signal 524 from the satellite 521. It will be further appreciated that the feeder downlink signal 524 includes a measure of the terrestrially generated interfering signal 523 received by the satellite 511.

The signal received by the satellite 521 of the second system 520 is conveyed from the gateway 526 of the second system 520 to the gateway 518 of the first system 510. The gateway 518 of the first system 510 may include an interference reducer (IR) 519 that is configured to process the signals received by the first and second satellites 511, 521 to recover the desired signal 515. The recovered signal 515 may be conveyed on to other network components 530, such as telephony network components (switches, routers, etc.) and/or ATN components. It will be appreciated that the IR 519 may receive other signal inputs that provide information and/or measure(s) on interference signals, for example, signal inputs from other spot beams, satellites and/or ancillary antennas along the lines described above with reference to FIGS. 1-3.

Figure 6:
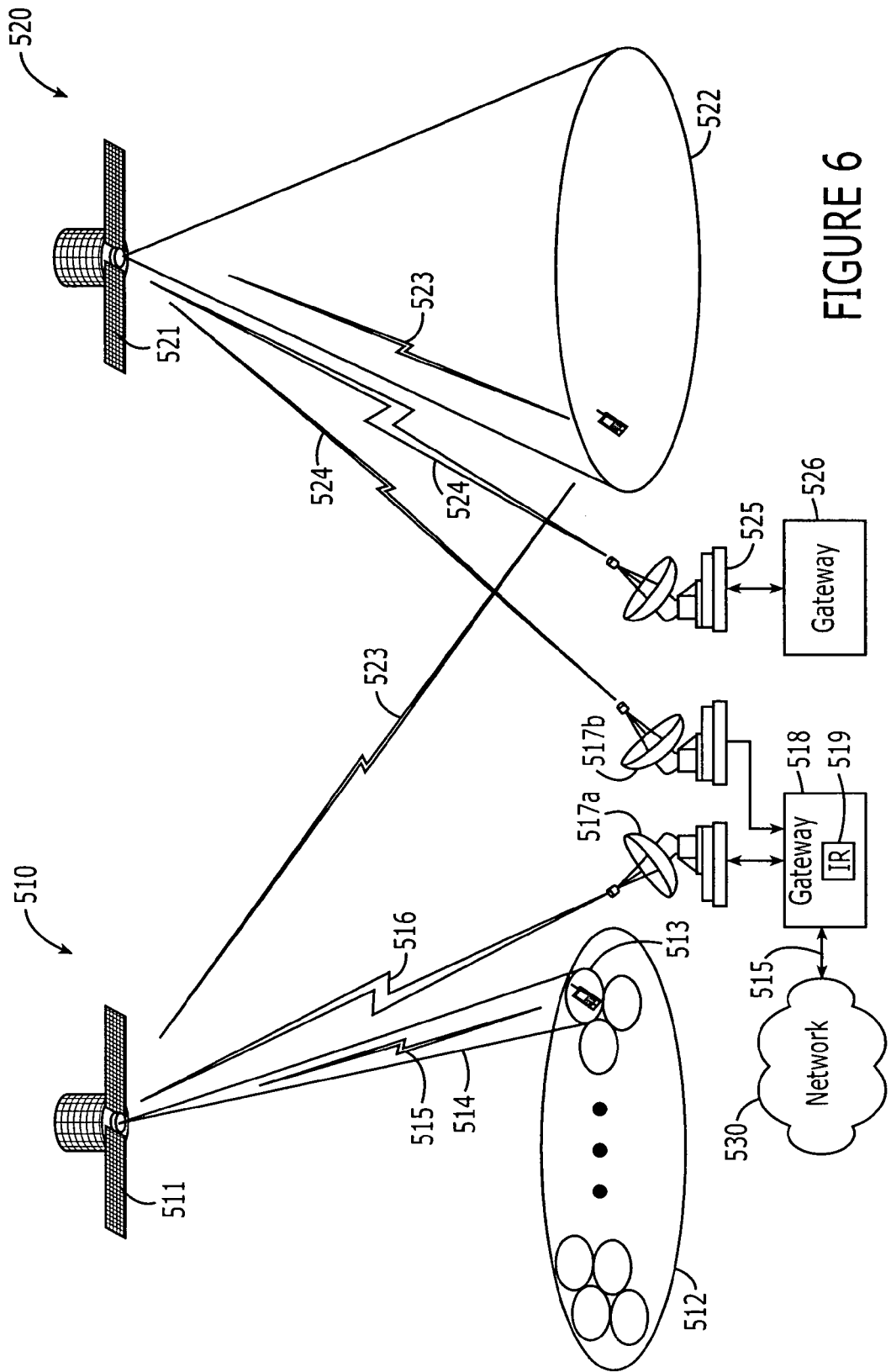

Referring to FIG. 6, in other embodiments of the present invention, for example, in applications in which signals generated in conjunction with an interfering system are not directly available from the interfering system, an interfering signal may be obtained by directly capturing a downlink feeder signal transmitted by the interfering system. For example, as illustrated in FIG. 6, in addition to a terrestrial antenna 517a configured to receive downlink feeder signals 516 transmitted by the satellite 511 of the first system 510, a terrestrial antenna 517b may be coupled to the gateway 518 of the first system 510 and configured to receive the downlink feeder signal 524 of the interfering second system 520. It will be appreciated that the first and second antennas 517a, 517b may be physically separate antennas and/or spatially diverse antenna beams supported by a single antenna structure and/or, for example, a beamforming network. It will be appreciated that the terrestrial antenna 517b may be coupled to the first system 510 in any of a number of different ways. It will be further appreciated that the IR 519 may be positioned in a different component of the first system 510, and may be distributed among multiple components of the first system 510.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of operating a satellite radiotelephone communications system, the method comprising:
  receiving a first radio signal via a first satellite reception path that serves a satellite cell, the received first radio signal including a desired satellite uplink signal transmitted from a first source using a frequency assigned to the satellite cell and an interfering signal transmitted from at least one second source using the frequency assigned to the satellite cell;
  receiving a second radio signal via a second satellite reception path that is configured to receive radio transmissions from another communications system that uses the frequency assigned to the satellite cell, the second radio signal including a measure of the interfering signal; and
  processing the first and second radio signals to recover the desired satellite uplink signal.

2. A method according to claim 1, wherein the second satellite reception path is configured to preferentially receive radio transmissions from an area outside of the satellite cell.

3. A method according to claim 2, wherein the area outside of the satellite cell comprises another satellite cell that uses the frequency assigned to the cell and/or a coverage area of another satellite communications system that uses the frequency assigned to the cell.

4. A method according to claim 2, wherein the satellite cell comprises a first satellite cell served by a first spot beam and wherein the second satellite reception path comprises a second spot beam that serves a second satellite cell of the satellite radiotelephone communications system.

5. A method according to claim 4, wherein at least one radiating source in a region of the second satellite cell uses a frequency assigned to the first satellite cell for satellite and/or terrestrial communications.

6. A method according to claim 4, wherein the second satellite cell is adjacent a third satellite cell that uses a frequency assigned to the first satellite cell.

7. A method according to claim 4, wherein the second satellite cell overlaps or is adjacent a terrestrial cell that uses a frequency assigned to the first satellite cell.

8. A method according to claim 4, wherein the satellite radiotelephone communications system comprises a first satellite radiotelephone communications system, and wherein the second satellite cell overlaps or is adjacent a coverage area of a second satellite radiotelephone communications system.

9. A method according to claim 2, wherein the first satellite reception path comprises a first satellite antenna positioned at a first satellite of the satellite radiotelephone communications system, and wherein the second satellite reception path comprises a second satellite antenna positioned at a second satellite of the satellite radiotelephone communications system.

10. A method according to claim 2, wherein the first satellite reception path comprises a first satellite antenna positioned at a satellite of the satellite radiotelephone communications system, and wherein the second satellite reception path is positioned at the same satellite.

11. A method according to claim 2, wherein the satellite radiotelephone communications system comprises a first satellite radiotelephone communications system, and wherein the second satellite reception path comprises a satellite of a second satellite radiotelephone communications system.

12. A method according to claim 11, wherein the second satellite reception path farther comprises an antenna configured to receive a feeder link transmission from the satellite of the second satellite radiotelephone communications system, and wherein the method further comprises conveying the feeder link transmission that is received by the antenna to the first satellite radiotelephone communications system.

13. A method according to claim 12, wherein the antenna is coupled to a gateway of the second satellite radiotelephone communications system, and wherein the method further comprises conveying the feeder link transmission that is received by to the first satellite radiotelephone communications system via the gateway of the second satellite radiotelephone communications system.

14. A method according to claim 12, wherein the antenna is coupled to a gateway of the first satellite radiotelephone communications system, and wherein the method further comprises conveying the feeder link transmission that is received by from the antenna to the gateway of the first satellite radiotelephone communications system.

15. A method according to claim 1, wherein processing the first and second radio signals to recover the desired satellite uplink signal comprises applying the first and second radio signals to an adaptive signal processor.

16. A method according to claim 1, wherein processing the first and second radio signals to recover the desired satellite uplink signal comprises:
applying the first and second radio signals to respective first and second transversal filters;
combining outputs of the first and second transversal filters; and
recovering the desired signal from the combined outputs.

17. A method according to claim 16, further comprising adjusting the first and second transversal filters responsive to the combined outputs.

18. A method according to claim 1, wherein receiving a second radio signal via a second satellite reception path comprises one or more of the following:
receiving the second radio signal via a satellite antenna spot beam other than a satellite antenna spot beam associated with reception of the first radio signal;
receiving the second radio signal via a satellite antenna other than a satellite antenna associated with reception of the first radio signal;
receiving the second radio signal via a satellite other than a satellite antenna spot beam associated with reception of the first radio signal; and
receiving the second radio signal via an antenna configured to receive feeder link transmissions from a satellite of a satellite radiotelephone communications system other than a satellite radiotelephone communications system associated with reception of the first radio signal.

19. A method according to claim 1, wherein the first and second satellite reception paths are configured to provide discrimination between the first and second sources based on a characteristic other than frequency.

20. A method of operating a satellite radiotelephone communications system, the method comprising:
receiving first and second radio signals via respective first and second spot beams that serve respective first and second satellite cells of the satellite radiotelephone communications system, the first radio signal including a desired satellite uplink signal transmitted from a first source in the first satellite cell using a frequency assigned to the first satellite cell and an interfering signal transmitted from at least one second source using the frequency assigned to the first satellite cell, the second radio signal including a measure of the interfering signal, the second spot beam configured to receive radio transmissions from another communications system that uses the frequency assigned to the first satellite cell; and
processing the first and second radio signals to recover the desired satellite uplink signal.

21. A method according to claim 20, wherein at least one radiating source in a region of the second satellite cell uses a frequency assigned to the first satellite cell for satellite and/or terrestrial communications.

22. A method according to claim 20, wherein the second satellite cell is adjacent a third satellite cell that uses a frequency assigned to the first satellite cell.

23. A method according to claim 20, wherein the second satellite cell overlaps or is adjacent a terrestrial cell that uses a frequency assigned to the first satellite cell.

24. A method according to claim 20, wherein the satellite radiotelephone communications system comprises a first satellite radiotelephone communications system, and wherein the second satellite cell overlaps or is adjacent a coverage area of a second satellite radiotelephone communications system.

25. A method according to claim 20, wherein the first and second spot beams are supported by respective first and second satellites of the satellite radiotelephone communications system.

26. A method according to claim 20, wherein the first and second spot beams are supported by one satellite of the satellite radiotelephone communications system.

27. A method according to claim 20, wherein processing the first and second radio signals to recover the desired satellite uplink signal comprises applying the first and second radio signals to an adaptive signal processor.

28. A method according to claim 20, wherein processing the first and second radio signals to recover the desired satellite uplink signal comprises:
applying the first and second radio signals to respective first and second transversal filters;
combining outputs of the first and second transversal filters; and
recovering the desired signal from the combined outputs.

29. A method according to claim 28, further comprising adjusting the first and second transversal filters responsive to the combined outputs.

30. A method of operating a first satellite radiotelephone communications system to reduce interference from a second satellite radiotelephone communications system, the method comprising:
receiving a first radio signal via a first satellite reception path that serves a satellite cell of the first satellite radiotelephone communications system, the received first radio signal including a desired satellite uplink signal transmitted from a first source using a frequency assigned to the satellite cell and an interfering signal transmitted from at least one second source communicating with the second satellite radiotelephone communications system using the frequency assigned to the satellite cell;
receiving a second radio signal via a second satellite reception path configured to preferentially receive transmissions from a coverage area of the second satellite radiotelephone communications system, the second radio signal including a measure of the interfering signal; and processing the first and second radio signals to recover the desired satellite uplink signal.

31. A method according to claim 30, wherein the first and second satellite reception paths are positioned at a satellite of the first satellite radiotelephone communications system.

32. A method according to claim 31, wherein the first and second satellite reception paths comprise respective first and second antennas positioned at the satellite of the first satellite radiotelephone communications system and configured such that the first and second antennas preferentially receive transmissions from respective first and second coverage areas of the first satellite radiotelephone communications system and the second satellite communications systems.

33. A method according to claim 30, wherein the first satellite reception path comprises a first antenna positioned at a satellite of the first satellite radiotelephone communications system, and wherein the second satellite reception path comprises a second antenna positioned at a satellite of the second satellite radiotelephone communications system.

34. A method according to claim 30, wherein the second satellite reception path comprises an antenna configured to receive feeder link transmissions from a satellite of the second satellite radiotelephone communications system.

35. A method according to claim 30, wherein processing the first and second radio signals to recover the desired satellite up link signal comprises applying the first and second radio signals to an adaptive signal processor.

36. A method according to claim 30, wherein processing the first and second radio signals to recover the desired satellite uplink signal comprises:

applying the first and second radio signals to respective first and second transversal filters;

combining outputs of the first and second transversal filters; and recovering the desired satellite uplink signal from the combined outputs.

37. A method according to claim 36, further comprising adjusting the first and second transversal filters responsive to the combined outputs.

38. A method of operating a first satellite radiotelephone communications system to reduce interference from a second satellite communications system, the method comprising:

receiving a first radio signal via a first satellite configured to preferentially receive transmissions from a coverage area of the first satellite radiotelephone communications system, the received first radio signal including a desired satellite uplink signal transmitted from a first source in the coverage area of the first satellite radiotelephone communications system and an interfering signal transmitted from at least one second source communicating with the second satellite communications system using at least one frequency of the desired satellite uplink signal;

receiving a second radio signal via a second satellite configured to preferentially receive transmissions from a coverage area of the second satellite communications system, the second radio signal including a measure of the interfering signal; and processing the first and second radio signals to recover the desired satellite uplink signal.

39. A method according to claim 38, wherein receiving a second radio signal via a second satellite comprises receiving the second radio signal from the second satellite via an antenna configured to receive feeder link transmissions from the second satellite.

40. A method according to claim 39, wherein receiving the second radio signal from the second satellite via an antenna comprises receiving the second radio signal from the second satellite via the antenna and a gateway of the second satellite communications system.

41. A method according to claim 38, wherein processing the first and second radio signals to recover the desired satellite uplink signal comprises applying the first and second radio signals to an adaptive signal processor.

42. A method according to claim 38, wherein processing the first and second radio signals to recover the desired satellite uplink signal comprises:

applying the first and second radio signals to respective first and second transversal filters;

combining outputs of the first and second transversal filters; and recovering the desired signal from the combined outputs.

43. A method according to claim 42, further comprising adjusting the first and second transversal filters responsive to the combined outputs.

44. A system comprising:

a first satellite reception path that serves a satellite cell and that receives a first radio signal including a desired satellite uplink signal transmitted from a first source using a frequency assigned to the satellite cell and an interfering signal transmitted from at least one second source using the frequency assigned to the satellite cell;

a second satellite reception path that is configured to receive radio transmissions from another communications system that uses the frequency assigned to the satellite cell, wherein the second satellite reception path is further configured to receive a second radio signal including a measure of the interfering signal; and an interference-suppressing signal processor that processes the first and second radio signals to recover the desired satellite uplink signal.

45. A system according to claim 44, wherein the second satellite reception path is configured to preferentially receive radio transmissions from an area outside of the satellite cell.

46. A system according to claim 45, wherein the area outside of the satellite cell comprises another satellite cell that uses the frequency assigned to the satellite cell and/or a coverage area of another satellite communications system that uses the frequency assigned to the satellite cell.

47. A system according to claim 45, wherein the satellite cell comprises a first satellite cell served by a first Spot beam and wherein the second satellite reception path comprises a second spot beam that serves a second satellite cell of the satellite radiotelephone communications system.

48. A system according to claim 47, wherein the second satellite cell uses a frequency assigned to the first satellite cell.

49. A system according to claim 47, wherein the second satellite cell is adjacent a third satellite cell that uses a frequency assigned to the first satellite cell.

50. A system according to claim 47, wherein the second satellite cell overlaps or is adjacent a terrestrial cell that uses a frequency assigned to the first satellite cell.

51. A system according to claim 47, wherein the satellite radiotelephone communications system comprises a first satellite radiotelephone communications system, and wherein the second satellite cell overlaps or is adjacent a coverage area of a second satellite radiotelephone communications system.

52. A system according to claim 45, wherein the first satellite reception path comprises a first satellite antenna positioned at a first satellite of a satellite radiotelephone communications system, and wherein the second satellite reception path comprises a second satellite antenna positioned at a second satellite of the satellite radiotelephone communications system.

53. A system according to claim 45, wherein the first satellite reception path comprises a first satellite antenna positioned at a satellite of a satellite radiotelephone communications system, and wherein the second satellite reception path is positioned at the same satellite.

54. A system according to claim 45, wherein the satellite cell comprises a satellite cell of a first satellite radiotelephone communications system, and wherein the second satellite reception path comprises a satellite cell of a second satellite radiotelephone communications system.

55. A system according to claim 54, wherein the second satellite reception path further comprises an antenna configured to receive a feeder link transmission from the satellite of the second satellite radiotelephone communications system, and wherein the gateway is configured to convey the feeder link transmission via the antenna to the first satellite radiotelephone communications system.

56. A system according to claim 55, wherein the antenna is coupled to a gateway of the second satellite radiotelephone communications system, and wherein the gateway is configured to convey the feeder link transmission to the first satellite radiotelephone communications system.

57. A system according to claim 55, wherein the antenna is coupled to a gateway of the first satellite radiotelephone communications system, and wherein the interference-suppressing signal processor receives the feeder link transmission from the antenna and the gateway of the first satellite radiotelephone communications system.

58. A system according to claim 44, wherein the interference-suppressing signal processor comprises an adaptive interference reducer.

59. A system according to claim 44, wherein the interference-suppressing signal processor comprises:
first and second transversal filters that receive respective ones of the first and second radio signals;
a combiner that combines outputs of the first and second transversal filters; and
a detector that recovers the desired signal from the combined outputs.

60. A system according to claim 59, wherein the interference-suppressing signal processor further comprises a controller that adjusts the first and second transversal filters responsive to the combined outputs.

61. A system according to claim 44, wherein the first and second satellite reception paths are configured to provide discrimination between the first and second sources based on a characteristic other than frequency.

62. An apparatus comprising:
an interference-suppressing signal processor configured to receive a first radio signal from a first satellite reception path that serves a satellite cell, the first radio signal including a desired satellite uplink signal transmitted from a first source using a frequency assigned to the satellite cell and an interfering signal transmitted from at least one second source using the frequency assigned to the satellite cell, to receive a second radio signal from a second satellite reception path that is configured to receive radio transmissions from another communications system that uses the frequency assigned to the satellite cell and that receives a second radio signal including a measure of the interfering signal, and to process the first and second radio signals to recover the desired satellite uplink signal.

63. An apparatus according to claim 62, wherein the interference-suppressing signal processor comprises an adaptive signal processor.

64. An apparatus according to claim 62, wherein the interference-suppressing signal processor comprises:
first and second transversal filters that receive respective ones of the first and second radio signals;
a combiner that combines outputs of the first and second transversal filters; and
a detector that recovers the desired signal from the combined outputs.

65. An apparatus according to claim 64, wherein the interference-suppressing signal processor further comprises a controller that adjusts the first and second transversal filters responsive to the combined outputs.

66. A satellite radiotelephone communications system comprising:
first and second spot beams that serve respective first and second satellite cells of the satellite radiotelephone communications system and that receive respective first and second radio signals, the first radio signal including a desired satellite uplink signal transmitted from a first source in the first satellite cell using a frequency assigned to the first satellite cell and an interfering signal transmitted from at least one second source using the frequency assigned to the first satellite cell, the second radio signal including a measure of the interfering signal; and
an interference-suppressing signal, the second spot beam configured to receive radio transmissions from another communications system that uses the frequency assigned to the first satellite cell processor that processes the first and second radio signals to recover the desired satellite uplink signal.

67. A system according to claim 66, wherein at least one radiating source in an area of the second satellite cell uses a frequency assigned to the first satellite cell to communicate terrestrially and/or with a satellite.

68. A system according to claim 66, wherein the second satellite cell is adjacent a third satellite cell that uses a frequency assigned to the first satellite cell.

69. A system according to claim 66, wherein the second satellite cell overlaps or is adjacent a terrestrial cell that uses a frequency assigned to the first satellite cell.

70. A system according to claim 66, wherein the satellite radiotelephone communications system comprises a first satellite radiotelephone communications system, and wherein the second satellite cell overlaps or is adjacent a coverage area of a second satellite radiotelephone communications system.

71. A system according to claim 66, wherein the first and second spot beams are supported by respective first and second satellites of the satellite radiotelephone communications system.

72. A system according to claim 66, wherein the first and second spot beams are supported by the same satellite of the satellite radiotelephone communications system.

73. A system according to claim 66, wherein the interference-suppressing signal processor comprises an adaptive signal processor.

74. A system according to claim 66, wherein the interference-suppressing signal processor comprises:
first and second transversal filters that receive respective ones of the first and second radio signals;

a combiner that combines outputs of the first and second transversal filters; and a detector that recovers the desired signal from the combined outputs.

75. A system according to claim 74, wherein the interference-suppressing signal processor further comprises a controller that adjusts the first and second transversal filters responsive to the combined outputs.

76. A system comprising:

a first satellite reception path that serves a satellite cell of a first satellite radiotelephone communications system and receives a first radio signal therefrom, the received first radio signal including a desired satellite uplink signal transmitted from a first source using a frequency assigned to the satellite cell and an interfering signal transmitted from at least one second source communicating with a second satellite radiotelephone communications system using the frequency assigned to the satellite cell;

a second satellite reception path that preferentially receives transmissions from a coverage area of the second satellite radiotelephone communications system and that receives a second radio signal including a measure of the interfering signal; and an interference-suppressing signal processor that processes the first and second radio signals to recover the desired satellite uplink signal.

77. A system according to claim 76, wherein the first and second satellite reception paths are positioned at a satellite of the first satellite radiotelephone communications system.

78. A system according to claim 77, wherein the first and second satellite reception paths comprise respective first and second antennas positioned at a satellite of the first satellite radiotelephone communications system and configured such that the first and second antennas preferentially receive transmissions from respective first and second coverage areas of the first satellite radiotelephone communications system and the second satellite radiotelephone communications systems.

79. A system according to claim 76, wherein the first satellite reception path comprises a first antenna positioned at a satellite of the first satellite radiotelephone communications system, and wherein the second satellite reception path comprises a second antenna positioned at a satellite of the second satellite radiotelephone communications system.

80. A system according to claim 76, wherein the second satellite reception path comprises an antenna configured to receive feeder link transmissions from a satellite of the second satellite radiotelephone communications system.

81. A system according to claim 76, wherein the interference-suppressing signal processor comprises an adaptive signal processor.

82. A system according to claim 76, wherein the interference-suppressing signal processor comprises:

first and second transversal filters that receive respective ones of the first and second radio signals;

a combiner that combines outputs of the first and second transversal filters; and a detector that recovers the desired signal from the combined outputs.

83. A system according to claim 82, wherein the interference-suppressing signal processor further comprises a controller that adjusts the first and second transversal filters responsive to the combined outputs.

84. A system comprising:

a first satellite configured to preferentially receive transmissions from a coverage area of a first satellite radiotelephone communications system and that receives a first radio signal including a desired satellite uplink signal transmitted from a first source in the coverage area of the first satellite radiotelephone communications system using a frequency and an interfering signal transmitted from at least one second source communicating with a second satellite communications system using the frequency;

an antenna configured to receive feeder link transmissions from a second satellite configured to preferentially receive transmissions from a coverage area of the second satellite communications system and that receives a second radio signal including a measure of the interfering signal; and an interference-suppressing signal processor that processes the first and second radio signals to recover the desired satellite uplink signal.

85. A system according to claim 84, wherein the interference-suppressing signal processor receives the second radio signal from the antenna via a gateway of the second satellite communications system.

86. A system according to claim 84, wherein the interference-suppressing signal processor comprises an adaptive signal processor.

87. A system according to claim 84, wherein the interference-suppressing signal processor comprises:

first and second transversal filters that receive respective ones of the first and second radio signals;

a combiner that combines outputs of the first and second transversal filters; and a detector that recovers the desired signal from the combined outputs.

88. A system according to claim 87, wherein the interference-suppressing signal processor further comprises a controller that adjusts the first and second transversal filters responsive to the combined outputs.

* * * * *

UNITED STATES PATENT AND TRADEMARK OFFICE
CERTIFICATE OF CORRECTION

PATENT NO. : 7,340,213 B2 Page 1 of 1
APPLICATION NO. : 10/890758
DATED : March 4, 2008
INVENTOR(S) : Karabinis et al.

It is certified that error appears in the above-identified patent and that said Letters Patent is hereby corrected as shown below:

Column 17, Claim12, Line 6: Please correct "farther"
　　　　　　　　　　　　　To read -- further --

Column 17, Claim 13, Line 16: Please correct "received by to the"
　　　　　　　　　　　　　To read -- received to the --

Column 17, Claim 14, Line 23: Please correct "received by from the"
　　　　　　　　　　　　　To read -- received by the --

Column 22, Claim 66, Line 32: Please insert -- processor -- after "signal"

Column 22, Claim 66, Line 35: Please delete "processor" after "cell"

Signed and Sealed this

Twenty-fourth Day of June, 2008

JON W. DUDAS
*Director of the United States Patent and Trademark Office*